United States Patent
Fry

(10) Patent No.: US 6,911,237 B1
(45) Date of Patent: Jun. 28, 2005

(54) HYDROPHILIC POLYURETHANES, PREPARATION THEREOF AND FIBER SIZES CONTAINING THE SAME

(75) Inventor: Douglas F. Fry, Azusa, CA (US)

(73) Assignee: Cognis Corporation, Ambler, PA (US)

( * ) Notice: Subject to any disclaimer, the term of this patent is extended or adjusted under 35 U.S.C. 154(b) by 0 days.

(21) Appl. No.: 10/188,876

(22) Filed: Jul. 3, 2002

Related U.S. Application Data

(60) Provisional application No. 60/306,272, filed on Jul. 18, 2001, and provisional application No. 60/303,056, filed on Jul. 5, 2001.

(51) Int. Cl.$^7$ ................................................ B05D 7/26
(52) U.S. Cl. .................... 427/389.9; 427/541; 427/177; 427/178; 523/402; 528/73
(58) Field of Search ............................. 427/541, 389.9, 427/177, 178, 384, 386; 523/402, 205; 528/73, 93; 525/528

(56) References Cited

U.S. PATENT DOCUMENTS

| | | | |
|---|---|---|---|
| 4,474,906 A | | 10/1984 | Nakama et al. |
| 4,918,119 A | * | 4/1990 | Seltmann et al. ........... 523/461 |
| 5,034,435 A | * | 7/1991 | Squiller et al. ............. 523/415 |
| 5,298,576 A | | 3/1994 | Sumida et al. |
| 5,686,541 A | * | 11/1997 | Wang et al. ................ 525/528 |

FOREIGN PATENT DOCUMENTS

JP        10273515     * 10/1998

OTHER PUBLICATIONS

Machine Translation, JP 10273515, Yoshida et al., Oct. 13, 1998.*

* cited by examiner

*Primary Examiner*—Randy Gulakowski
*Assistant Examiner*—Christopher Keehan
(74) *Attorney, Agent, or Firm*—Aaron R. Ettelman

(57) ABSTRACT

Water-soluble polyurethanes prepared by reacting a polyisocyanate and a polyalkylene oxide polyol at a molar ratio sufficient to form an isocyanate-terminated polymer, and reacting the isocyanate-terminated polymer with an epoxy alcohol to form a water-soluble, epoxy-terminated polyurethane, are disclosed. Also disclosed are aqueous fiber sizing compositions including the water-soluble polyurethanes described.

19 Claims, No Drawings

HYDROPHILIC POLYURETHANES, PREPARATION THEREOF AND FIBER SIZES CONTAINING THE SAME

CROSS-REFERENCE TO RELATED APPLICATIONS

This application claims priority, under 35 U.S.C. §119(e), of provisional U.S. Patent Application Nos. 60/303,056, filed on Jul. 5, 2001, and 60/306,272, filed on Jul. 18, 2001, the entire contents of each of which are incorporated herein by reference.

BACKGROUND OF THE INVENTION

Sizing compositions can be used to improve certain processing properties of glass or carbon fibers, such as, for example; fiber bundle cohesion, bundling, spreadability, fuzz formation resistance, fiber smoothness and softness, abrasion resistance and easy and nondestructive unwindability of bobbined fiber bundles. Sizing compositions can also affect the physical properties of the composite containing the treated fibers.

The reinforced plastics industry has used glass fibers in various forms for reinforcing polymeric matrices to produce a variety of products. Glass fibers have been used in the form of continuous and chopped filaments and strands and rovings and woven and nonwoven fabrics to reinforce polymers. Thermosetting polymeric matrices have been reinforced with a variety of different forms of glass fibers resulting in the production of products such as: sheet molding compounds, bulk molding compounds, pultrusion products, panel products, spray up molding products, etc.

Production of glass fibers for the polymeric reinforcement market involves, attenuation of the glass fibers from molten streams of fiberizable glass material from a bushing or like device connected to a furnace containing molten fiberizable glass material. The glass fibers are attenuated by conventional means such as winders or pull wheels. In the process of producing glass fibers, a chemical composition is applied to them shortly after they are attenuated as the molten streams of glass. Prior to the present invention, the chemical composition has traditionally been an aqueous solution, foam or gel composition containing film forming polymeric materials, coupling or keying agents, lubricants and sometimes processing aids. This chemical composition or sizing is necessary in order to retard inter filament abrasion of the glass fibers when they are gathered into a bundle of glass fibers or strands. It is also required in order to make the glass fibers compatible with polymer matrices that they are used to reinforce. After application of the sizing, the fibers are then dried either in the package form or in the chopped strand form before they are used for reinforcement.

In addition to glass fibers, carbon fibers have been found to combine excellent mechanical properties, such as high tensile strength and high modulus of elasticity, on the one hand, and low-density, high heat resistance and chemical resistance on the other. This combination of properties has led to the increased use of these materials as reinforcing elements in composite materials for a wide range of applications in industries as diverse as aerospace, transportation and sporting goods.

Optimal properties of carbon fibers are only obtained if integral adhesion between the matrix material and the reinforcing fiber is ensured over a wide range of varying temperature and moisture conditions. To achieve this, carbon fibers are given an oxidative surface treatment and subsequently provided with a sizing agent suitable for that fiber and its intended use. Sizing is used to prevent the formation of broken filaments (i.e., fuzz) during processing and weaving of the carbon fiber tow bundle.

Not only is it necessary that the sizing protect the fiber and impart improved physical properties, but it must also be chemically compatible with the particular matrix material so as to produce the qualitatively high-grade and durable composite materials. Sizing agents can be grouped into two types: solvent and emulsion types. In emulsion types, the resins are dispersed in water with the aid of dispersants and/or emulsifiers. In the solvent type, the polymer, usually a resin, is in solution in a low-boiling organic solvent and is applied to the fibers from a dilute solution. Both forms of sizing can add VOCs to the production environment. This adds time and expense to the production process.

Previous aqueous sizings have contained a significant amount of volatile organic components. The industry, in an effort to prevent environmental problems, has been attempting to find ways of minimizing levels of VOCs while maintaining the physical properties of the fibers.

Thus, there is a need in the art for a sizing composition which contains little or no volatile organic compounds and is capable of providing desired physical properties to treated fibers.

BRIEF SUMMARY OF THE INVENTION

Accordingly, the present invention is directed to the preparation of a water-soluble polyurethane that can be used alone or as part of a blend for sizing of fibers, and more particularly, high performance fibers. The present invention includes hydrophilic polyurethanes useful in the sizing of fibers, wherein the polyurethanes are prepared by reaction of a polyalkylene oxide polyol with a polyisocyanate in a molar ratio such that the polymer chain terminates in isocyanate groups. The terminal isocyanate groups are then reacted with an epoxy alcohol to cap the polyurethane and provide reactive functional groups that improve the compatibility of the polymer with resins used in making composites from the sized fibers.

Thus, the present invention includes a polyurethane prepared by a process comprising: (a) providing a polyisocyanate; (b) providing a polyalkylene oxide polyol; (c) reacting the polyisocyanate and the polyalkylene oxide polyol at a molar ratio sufficient to form an isocyanate-terminated polymer; and (d) reacting the isocyanate-terminated polymer with an epoxy alcohol to form a water-soluble, epoxy-terminated polyurethane.

The present invention also includes aqueous fiber sizing compositions which comprise water and a water-soluble polyurethane prepared by the process set forth above. Additionally, other embodiments of the present invention include a method of sizing fibers using aqueous fiber sizing compositions in accordance herewith, and methods of preparing such polyurethanes.

Compositions in accordance with the present invention surprisingly not only meet and exceed environmental concerns over VOCs, but also reduce the overall cost of producing treated fibers by eliminating the need for drying ovens. In addition, the application of sizing compositions to glass and carbon fibers according to the present invention does not require the use of water or solvent; thus, allowing for the use of a greater range of polymers, lubricants and new chemistries. Accordingly, the present invention provides a greater range of applications for the use of reinforced plastics. Use of compositions in accordance with the present invention imparts highly desirable properties to the sized fiber, including low fuzz and friction, and improved weavability

DETAILED DESCRIPTION OF THE INVENTION

Polyurethanes in accordance with the present invention are useful for sizing fibers, particularly high performance fibers such as, for example, carbon fibers, fiberglass, and polyamides such as aromatic polyamides (e.g., Kevlar® fibers).

The hydrophilic polyurethanes according to the present invention can be prepared by reaction of an alkylene oxide-derived polyol with a polyisocyanate, with subsequent capping of terminal isocyanate groups using epoxy alcohols.

Polyols useful in accordance with preferred embodiments of the present invention typically have molecular weights in the range of about 400 to about 50,000, preferably 400 to 20,000, with a molecular weight range of 400 to 10,000 being most preferred. Particularly preferred polyols have a molecular weight of about 8000. The polyols can be obtained by reacting (i) compounds having at least two active hydrogen atoms and (ii) an alkylene oxide. Commercially available polyols includes Carbowax® polyethylen glycol 8000, and Dow® polyglycol E-8000.

Active hydrogen compounds useful in preparing polyols in accordance with preferred embodiments of the present invention include aliphatic polyols such as, for example, ethylene glycol, phenolic compounds such as bisphenol A, aliphatic or aromatic amines, and polycarboxylic acids such as succinic acid. Of these, aliphatic amines, bisphenols, and aliphatic diols are preferred, with the latter being most preferred. Suitable alkylene oxides for use in the present invention for the preparation of preferred polyols include, but are not limited to, ethylene oxide, propylene oxide, and butylene oxide.

The polyisocyanates to be used in the present invention can be either aliphatic or aromatic. Examples of suitable aliphatic polyisocyanates include hexamethylene diisocyanate (e.g., 1,6-hexamethylene diisocyanate), isophorone diisocyanate, and 1,4-methylenebis(cyclohexyl isocyanate). Examples of suitable aromatic polyisocyanates include naphthalene diisocyanate, diphenylmethane-4,4'-diisocyanate, 2,4-tolylene diisocyanate, 2,6-tolylene diisocyanate, or mixtures of 2,4- and 2,6-tolylene diisocyanate. Of the two general classes of polyisocyanates, aromatic polyisocyanates are preferred for use in the present invention. Furthermore, while triisocyanates could be used or may be present in mixtures of diisocyanates, diisocyanates are preferred in order to avoid two-dimensional growth of the polymer which may lead to insolubility.

In accordance with the present invention, the terminal isocyanate groups of the polyurethane prepolymer are capped with an epoxy alcohol, normally with continued heating. Epoxy alcohols suitable for capping the polyurethane include those derived from either aromatic or aliphatic polyols, such as, for example, bisphenol A, bisphenol F, or glycerol, by reaction with epichlorohydrin, or from unsaturated alcohols such as soybean oil, by epoxidation. Glycidyl ether epoxy resins are preferred.

The polyurethanes according to the present invention are preferably prepared by reaction of a polyisocyanate and a polyol, wherein the ratio of isocyanate functional groups to hydroxyl functional groups ("NCO/OH ratio") is maintained such that the initially formed polymer contains unreacted terminal isocyanate groups. Suitable NCO/OH ratios in accordance with the present invention can range from about 2:1 to about 1.20:1, and preferably from about 1.5:1 to about 1.20:1, with a ratio of between about 1.33:1 to about 1.20:1 being most preferred.

Formation of the polyurethanes in accordance with the present invention can be carried out in the presence or absence of solvent. Solvents that can be used in the preparation include, but are not limited to, cyclohexane, toluene, xylene, methyl ethyl ketone, methyl isobutyl ketone, ethyl acetate, and dimethylformamide. The preferred solvents are methyl ethyl ketone, methyl isobutyl ketone, cyclohexane, and toluene. Additionally, the polyurethanes in accordance with the present invention can be prepared with or without the use of a catalyst. Suitable catalysts which may be employed in the preparation of the polyurethanes according to the present invention include, but are not limited to, amines such as triethylamine or triethylenediamine, or Sn(II) catalysts such as dibutyltin dilaurate and tin(II) octoate. Generally, any effective amount of catalyst, from zero to a stoichiometric excess could be used. Normally an amount of approximately 0.001% by weight based upon the total reactant weight is used.

The urethane compound can be prepared by any suitable process. The process is not critical, however, the NCO/OH ratio should be maintained such that the resulting polymer contains terminal isocyanate groups. Typically, a polyol is reacted with a polyisocyanate at a temperature between 75° C. and 120° C., preferably 80° to 100° C. The reaction is allowed to proceed until the percent unreacted isocyanate reaches a certain level, at which time the epoxy alcohol is added. Generally, the percentage of unreacted isocyanate at desired completion should be from about 0.10 to about 0.30%. More preferably, the reaction should be allowed to proceed until the percentage of unreacted isocyanate is from about 0.13 to about 0.25%. Even more preferably, the reaction should be allowed to proceed until the percentage of unreacted isocyanate is from about 0.13 to about 0.20%. Most preferably, the reaction should be allowed to proceed until the percentage of unreacted isocyanate is from about 0.13 to about 0.19%. Percent unreacted isocyanate levels can be measured by any known method. For example, titration with dibutyl amine or standard IR methods could be used.

Once the desired percentage of unreacted isocyanate has been attained, the epoxy alcohol is added and heating is continued at a temperature between 75° C. and 120° C., preferably 80° to 100° C. Reaction between the isocyanate-terminated polymer and the epoxy alcohol is complete when the desired percent NCO is reached. Preferably, the percent NCO at desired completion should be less than about 0.10%. The polyurethane may then be dissolved in water, with subsequent distillation of any solvent used in the reaction.

An aqueous sizing agent for high performance fibers can be prepared by dissolving the urethane compound in water. Other substances can be added to the sizing mixture, including epoxy resins, lubricants, wetting agents, etc. as necessary. The concentration of the sizing mixture usually ranges from 0.1 to 10% based on solids content. The sizing mixture can be applied to the fiber by a variety of means, including spraying, dipping, or kiss roll. Once sizing has been applied to the fiber the fiber is dried at temperatures ranging from 100° C. to 300° C. using infrared lamps, hot air, or drying drums.

Fibers sized using aqueous solutions of the invention, either alone or in blends, exhibit improved processing characteristics when compared to fibers sized using other sizing agents. These characteristics include reduced friction, decreased fuzz levels, and improved weavability.

The present invention will now be illustrated in more detail by reference to the following specific, non-limiting example.

EXAMPLE 1

Approximately 1.04 moles of Carbowax® polyethylene glycol 8000 with a molecular weight of about 8700 (Union Carbide Corporation, South Charleston, W. Va.) were melted and heated with stirring to about 110° C. A high nitrogen sweep was begun and held for one hour to drive off any water. The dried PEG was cooled to 80° C., and 2.95 grams of methanesulfonic acid, 99% (Aldrich Chemical) were added. 4500 grams of methyl isobutyl ketone were added, and the mixture was stirred at 75° C. until homogeneous. 1.33 moles of tolylene 2,4-diisocyanate (Aldrich Chemical, technical grade, 80% 2,4-isomer, remainder 2,6-isomer). The reaction was heated to 85° C., and held at that temperature until the residual isocyanate levels were less than 0.28%. 0.93 grams of Dabco T-9 catalyst (Air Products) were added to the PEG/toluene solution, followed by 317 grams of GE-100 glycidyl ether (Raschig Corporation, Richmond, Va.) were added, and the reaction continued at 85° C. until the residual isocyanate levels fell below 0.10%. The polyurethane solution was mixed with deionized water that had been heated to 45° C., and the mixture was stirred until the consistency was uniform. The aqueous polyurethane/MIBK mixture was heated to 55° C. under a high nitrogen sparge, and distillation of the MIBK/water azeotrope was allowed to continue until the residual MIBK levels dropped below 1%. The aqueous polyurethane was a viscous, hazy, light yellow liquid.

EXAMPLE 2

Approximately 1.04 moles of Carbowax® polyethylene glycol 8000 with a molecular weight of about 8700 (Union Carbide Corporation, South Charleston, W. Va.) were melted and heated with stirring to about 125° C. A high nitrogen sweep was begun and held for one hour to drive off any water. The dried PEG was cooled 80° C., and 2.95 grams of methanesulfonic acid, 99% (Aldrich Chemical) were added. 1.33 moles of tolylene 2,4-diisocyanate (Aldrich Chemical, technical grade, 80% 2,4-isomer, remainder 2,6-isomer) were added over about 15 minutes to the acidified PEG. The reaction was held at 80° C. for two hours, then was heated to 100° C. and held for two hours. Toluene (4000 g) was added, and the clear mixture was stirred at 80° C. for 30 minutes. 0.93 grams of Dabco T-9 catalyst (Air Products) were added to the polyurethane/toluene solution, and the mixture was held at 80° C. until the residual isocyanate level was less than 0.30%. 317 grams of GE-100 glycidyl ether (Raschig Corporation, Richmond, Va.) were added, and the reaction continued at 80° C. until the residual isocyanate level fell below 0.15%. The polyurethane solution was mixed with deionized water, and the mixture stirred while heating to 85° C. under a high nitrogen sweep. Once distillation of the toluene/water azeotrope slowed, sufficient deionized water was added to the polyurethane solution to attain a solids content of 30%. The solution was cooled to 45° C. and 65 grams of Nalco 8386 Papermill Slimicide (Nalco Chemical, Naperville, Ill.) was added. After mixing for 30 minutes the aqueous polyurethane was a viscous, hazy, light yellow liquid

EXAMPLE 3

Approximately 1.04 moles of Carbowax® polyethylene glycol 8000 with a molecular weight of about 8700 (Union Carbide Corporation, South Charleston, W. Va.) were melted and heated with stirring to about 125° C. A high nitrogen sweep was begun and held for one hour to drive off any water. The dried PEG was cooled 80° C., and 2.95 grams of methanesulfonic acid, 99% (Aldrich Chemical) were added. 1.33 moles of tolylene 2,4-diisocyanate (Aldrich Chemical, technical grade, 80% 2,4-isomer, remainder 2,6-isomer) were added over about 15 minutes to the acidified PEG. The reaction was held at 80° C. for two hours, then was heated to 100° C. and held for two hours. Toluene (400 g) was added, and the clear mixture was stirred at 80° C. for 30 minutes. 0.93 grams of Dabco T-9 catalyst (Air Products) were added to the polyurethane/toluene solution, and the mixture was held at 80° C. until the residual isocyanate level was less than 0.19%. 317 grams of GE-100 glycidyl ether (Raschig Corporation, Richmond, Va.) were added, and the reaction continued at 80° C. until the residual isocyanate level fell below 0.10%. The polyurethane solution was mixed with deionized water, and the mixture stirred while heating to 85° C. under a high nitrogen sweep. Once distillation of the toluene/water axeotrope slowed, sufficient deionized water was added to the polyurethane solution to attain a solids content of 30%. The solution was cooled to 45° C. and 65 grams of Nalco 8386 Papermill Slimicide (Nalco Chemical, Naperville, Ill.) was added. After mixing for 30 minutes the aqueous polyurethane was a viscous, hazy, light yellow liquid.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An aqueous fiber sizing composition comprising water and from about 0.1 to about 10% by weight of a polyurethane prepared by a process comprising:

(a) providing a polyisocyanate;

(b) providing a polyalkylene oxide polyol;

(c) reacting the polyisocyanate and the polyalkylene oxide polyol at a molar ratio sufficient to form an isocyanate-terminated polymer; and (d) reacting the isocyanate-terminated polymer with an epoxy alcohol to form a water-soluble, epoxy-terminated polyurethane.

2. The aqueous fiber sizing composition according to claim 1, wherein the polyisocyanate comprises an aromatic polyisocyanate.

3. The aqueous fiber sizing composition according to claim 1, wherein the polyisocyanate comprises a diisocyanate component selected from the group consisting of 2,4-tolylene diisocyanate, 2,6-tolylene diisocyanate and mixtures thereof.

4. The aqueous fiber sizing composition according to claim 1, wherein the polyalkylene oxide polyol has a molecular weight of from about 400 to 50,000.

5. The aqueous fiber sizing composition according to claim 1, wherein the polyalkylene oxide polyol comprises a reaction product of an aliphatic diol and an alkylene oxide selected from the group consisting of ethylene oxide, propylene oxide, butylene oxide and mixtures thereof.

6. The aqueous fiber sizing composition according to claim 1, wherein the polyisocyanate and the polyalkylene oxide polyol are reacted at an isocyanate functional group to hydroxyl functional group ratio of from about 2:1 to about 1.2:1.

7. The aqueous fiber sizing composition according to claim 1, wherein the polyisocyanate and the polyalkylene oxide polyol are reacted in a solvent selected from the group consisting of methyl ethyl ketone, methyl isobutyl ketone, cyclohexane, toluene, and mixtures thereof.

8. The aqueous fiber sizing composition according to claim 1, wherein the polyisocyanate and the polyalkylene oxide polyol are reacted in the presence of an effective amount of a catalyst selected from the group consisting of amines and Sn(II) catalysts.

9. The aqueous fiber sizing composition according to claim 1, wherein the epoxy alcohol comprises a reaction product of epichlorohydrin and a polyol selected from the group consisting of bisphenol A, bisphenol F, glycerol and mixtures thereof.

10. A method of sizing fibers, said method comprising:
   (a) providing a fiber to be sized;
   (b) providing an aqueous fiber sizing composition comprising water and a polyurethane prepared by a process comprising: (i) providing a polyisocyanate; (ii) providing a polyalkylene oxide polyol; (iii) reacting the polyisocyanate and the polyalkylene oxide polyol at a molar ratio sufficient to form an isocyanate-terminated polymer; and (iv) reacting the isocyanate-terminated polymer with an epoxy alcohol to form a water-soluble, epoxy-terminated polyurethane;
   (c) applying the aqueous fiber sizing composition to the fiber; and
   (d) drying the fiber.

11. The method according to claim 10, wherein the polyurethane is present in the composition in an amount of from about 0.1 to about 10% by weight.

12. The method according to claim 10, wherein the polyisocyanate comprises an aromatic polyisocyanate.

13. The method according to claim 10, wherein the polyisocyanate comprises a diisocyanate component selected from the group consisting of 2,4-tolylene diisocyanate, 2,6-tolylene diisocyanate and mixtures thereof.

14. The method according to claim 10, wherein the polyalkylene oxide polyol has a molecular weight of from about 400 to 50,000.

15. The method according to claim 10, wherein the polyalkylene oxide polyol comprises a reaction product of an aliphatic diol and an alkylene oxide selected from the group consisting of ethylene oxide, propylene oxide, butylene oxide and mixtures thereof.

16. The method according to claim 10, wherein the polyisocyanate and the polyalkylene oxide polyol are reacted at an isocyanate functional group to hydroxyl functional group ratio of from about 2:1 to about 1.2:1.

17. The method according to claim 10, wherein the polyisocyanate and the polyalkylene oxide polyol are reacted in a solvent selected from the group consisting of methyl ethyl ketone, methyl isobutyl ketone, xyclohexane, toluene, and mixtures thereof.

18. The method according to claim 10, wherein the polyisocyanate and the polyalkylene oxide polyol are reacted in the presence of an effective amount of a catalyst selected from the group consisting of amines and Sn(II) catalysts.

19. The method according to claim 10, wherein the epoxy alcohol comprises a reaction product of epichlorohydrin and a polyol selected from the group consisting of bisphenol A, bisphenol F, glycerol and mixtures thereof.

* * * * *